US012559062B2

(12) United States Patent
Iglesias Cid

(10) Patent No.: US 12,559,062 B2
(45) Date of Patent: Feb. 24, 2026

(54) METHOD FOR LOCKING AND UNLOCKING A MOTOR VEHICLE, MOTOR VEHICLE AND COMMUNICATION SYSTEM

(71) Applicant: MERCEDES-BENZ GROUP AG, Stuttgart (DE)

(72) Inventor: Oscar Iglesias Cid, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 6 days.

(21) Appl. No.: 18/708,463

(22) PCT Filed: Oct. 11, 2022

(86) PCT No.: PCT/EP2022/078234
§ 371 (c)(1),
(2) Date: May 8, 2024

(87) PCT Pub. No.: WO2023/083542
PCT Pub. Date: May 19, 2023

(65) Prior Publication Data
US 2025/0042358 A1      Feb. 6, 2025

(30) Foreign Application Priority Data
Nov. 9, 2021    (DE) ..................... 10 2021 005 527.6

(51) Int. Cl.
*B60R 25/24*          (2013.01)
*B60R 25/04*          (2013.01)
(52) U.S. Cl.
CPC .............. *B60R 25/24* (2013.01); *B60R 25/04* (2013.01); *B60R 2325/205* (2013.01)

(58) Field of Classification Search
None
See application file for complete search history.

(56) References Cited

U.S. PATENT DOCUMENTS 10,147,253 B1 * 12/2018  Proefke ............... B60R 25/2009
11,110,890 B2    9/2021  Lutterbeck et al.
(Continued)

FOREIGN PATENT DOCUMENTS

AU       2014221215 B2     4/2015
DE     102014220752 A1     4/2015
(Continued)

OTHER PUBLICATIONS

Office Action dated Apr. 7, 2025 in related/corresponding EP Application No. 22800672.2.
(Continued)

*Primary Examiner* — Carlos Garcia
(74) *Attorney, Agent, or Firm* — PATENT PORTFOLIO BUILDERS PLLC

(57) ABSTRACT

A method for locking and unlocking a motor vehicle having an operating device, which is mounted on the motor vehicle and can be actuated, and a communication system is provided. The operating device and the communication system communicate with a control device of the motor vehicle. An authorization key is provided to the control device, which locks the motor vehicle. The motor vehicle is unlocked by the control device if a successful user-authentication of a user of the motor vehicle has been performed. It is essential that the user of the motor vehicle activates and deactivates the execution of the method for locking and unlocking the motor vehicle by the communication system.

14 Claims, 1 Drawing Sheet

(56)  References Cited

U.S. PATENT DOCUMENTS

| 11,136,000 | B2 * | 10/2021 | Cumbo | B60R 25/2045 |
|---|---|---|---|---|
| 2015/0102898 | A1 * | 4/2015 | Huennekens | B60R 25/24 |
| | | | | 340/5.6 |
| 2017/0072908 | A1 | 3/2017 | Liubakka et al. | |
| 2019/0152433 | A1 * | 5/2019 | Cumbo | G07C 9/00714 |

FOREIGN PATENT DOCUMENTS

| DE | 102017105272 | A1 | 9/2017 |
|---|---|---|---|
| DE | 102018119862 | A1 | 2/2019 |
| DE | 102018128539 | A1 | 6/2019 |
| DE | 102018003111 | A1 | 10/2019 |

OTHER PUBLICATIONS

International Search Report and Written Opinion mailed Feb. 15, 2023 in related/corresponding International Application No. PCT/EP2022/078234.
Office Action created May 20, 2022 in related/corresponding DE Application No. 10 2021 005 527.6.

* cited by examiner

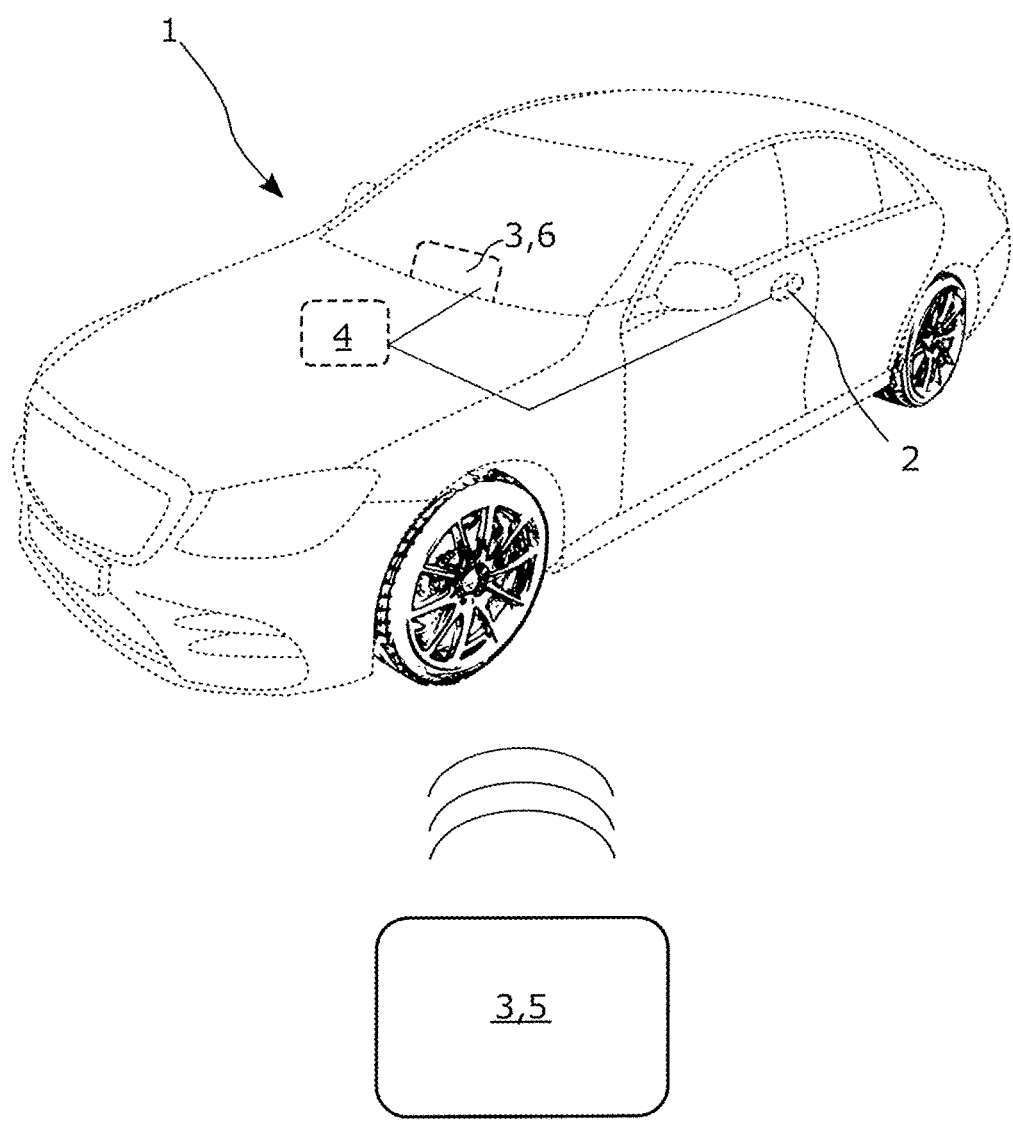

METHOD FOR LOCKING AND UNLOCKING A MOTOR VEHICLE, MOTOR VEHICLE AND COMMUNICATION SYSTEM

BACKGROUND AND SUMMARY OF THE INVENTION

Exemplary embodiments of the invention relate to a method for locking and unlocking a motor vehicle, as well as to a motor vehicle and to a communication system.

A method for locking and unlocking a motor vehicle according to the type explained above is known from DE 10 2014 220 752 A1. Further methods for locking and unlocking motor vehicles are known from DE 10 2018 003 111 A1 and US 2017/0 072 908 A1.

An access device for a motor vehicle is described in DE 10 2018 119862 A1, which has a first vehicle subsystem controlling access to an interior of the motor vehicle, an actuator, which is mounted on the motor vehicle and can be moved between a first and a second position, and a controller coupled to the actuator. The access device is thus set up to detect a first actuation sequence of the actuator, wherein this actuation sequence represents an access key. By comparing the access key with a stored authorization key, a control signal is generated by means of which the vehicle subsystem of the motor vehicle is caused to lock or unlock the motor vehicle. A similar device is also described in DE 10 2017 105272 A1. However, these known devices are relatively inconvenient with regards to their operation, whereas convenient and easy-to use devices are desired to improve user comfort.

Exemplary embodiments of the invention are therefore directed to an improved or at least another embodiment of a method for locking and unlocking a motor vehicle. In particular, a motor vehicle and a communication system to execute the method for locking and unlocking a motor vehicle should be specified.

The fundamental idea of the invention is to make it possible to control a method for locking and unlocking a motor vehicle having a communication system that can be operated comfortably by a user of the motor vehicle.

To this end, according to the invention, a method for locking and unlocking a motor vehicle is proposed, wherein an operating device that can be actuated from outside the motor vehicle is mounted on the motor vehicle and a communication system is provided, wherein the operating device and the communication system communicate with a control device of the motor vehicle. The method comprises the steps:

providing an authorization key to the control device, required in the following steps for carrying out user authentication;

locking the motor vehicle by means of the control device. Conveniently, the motor vehicle doors of the motor vehicle are locked, i.e., secured against opening, as soon as it is detected that the doors are completely closed and/or that there are no users located in the motor vehicle. The locking of the motor vehicle doors can also depend on whether it is detected that the motor vehicle hoods and/or windows of the motor vehicle are open. For example, locking can be blocked until all the motor vehicle hoods and/or windows of the motor vehicle are completely closed;

unlocking the motor vehicle by means of the control device by performing user authentication of a user of the motor vehicle. For this purpose, an access key is provided to the control device by detecting a sequence of actuations of the operating device and storing these in the control device as an access key. The stored access key is subsequently compared with the authorization key saved in the control device, wherein the locked state of the motor vehicle is maintained if the access key does not match the authorization key, and wherein the motor vehicle is unlocked if the access key matches the authorization key. It is essential that the user of the motor vehicle activates and deactivates the execution of the method for locking and unlocking the motor vehicle by means of the communication system.

The method according to the invention for locking and unlocking a motor vehicle provides a user of the motor vehicle a new type of user authentication with regard to the classic user authentications known to date, for example those with a car key, a keyless go function implemented in a car key or a key function implemented in a mobile telephone, in which no actual physical key is used. Instead, an immaterial password referred to as an access key is used, which is input to the locked motor vehicle by actuating an operating device of the motor vehicle which can be actuated from outside the motor vehicle in a predetermined sequence. If the access key matches with an authorization key stored in the motor vehicle, i.e., if the user is authorized to lock/unlock the motor vehicle, the locking of the motor vehicle is disabled. This enables the user of the motor vehicle to safely keep their car key and/or their mobile telephone in the interior of the motor vehicle for example, while they can lock or unlock the motor vehicle by means of the method according to the invention. A conceivable scenario, in which the method according to the invention creates a significant convenience advantage, may be a so-called beach situation, in which the user of the motor vehicle would like to keep their car key and/or mobile telephone in the motor vehicle in order to be able to go swimming without having to take any inconvenient equipment with them, for example.

The method according to the invention can also be referred to as beach mode and/or can be implemented in the control device of the motor vehicle and executed by the same. The control device is conveniently set up to execute the method for locking and unlocking a motor vehicle and in particular comprises a computing unit, a storage unit, and a communication unit.

It is expedient if the communication system is provided by a mobile communication device designed to be separate from the motor vehicle. It is conceivable that the communication device is realized by a mobile telephone, colloquially a smartphone. Therefore, it is possible that a user of the motor vehicle can activate or deactivate the method for locking and unlocking a motor vehicle from outside of the motor vehicle. This has the advantage that by means of the communication device, a user can switch back and forth between classic user authentication (key, key with keyless go function) and the proposed new type of user authentication by means of the method according to the invention. Therefore, the motor vehicle can be operated significantly more conveniently than before.

It is at least conceivable that the authorization key that is required for performing the user authentication as part of the method according to the invention is generated by means of the communication device and/or is provided to the control device of the motor vehicle.

The communication device or the mobile telephone may comprise an executable program (so-called app) tailored to the method according to the invention, which has commands which, when the program is executed by the mobile telephone, cause the latter to communicate with the control device of the motor vehicle in order, in turn, to cause the control device to execute the method according to the invention. In other words, the communication device or the mobile telephone has a program (app), by means of which the method according to the invention can be activated or deactivated. This has the advantage that a user can conveniently use the method according to the invention from the communication device or the mobile telephone.

It is also useful if the communication system is provided by a communication terminal mounted on the motor vehicle. For example, the communication terminal can be realized by a visual, auditory, or audiovisual display, which is permanently installed on the motor vehicle. In practice, a corresponding communication terminal is also referred to as a head unit. Conveniently, the communication terminal is set up to communicate with the control device of the motor vehicle and, if necessary, with a communication device, such that inputs entered by the user to the communication terminal can be transmitted for communication between these components. Similarly, this has the advantage that a user can conveniently operate the method according to the invention.

It is at least conceivable that the authorization key that is required for performing the user authentication as part of the method according to the invention is also generated by means of the communication terminal and/or is provided on the control device of the motor vehicle.

According to the invention, it is further provided that the activation and/or deactivation of the execution of the method for locking and unlocking the motor vehicle is access-protected by a key word. Thus, the method according to the invention for locking and unlocking the motor vehicle can only be activated or deactivated by an authorized user, whereby misuse is efficiently prevented. Conveniently, the authorized user can provide the key word (password) by means of the communication system, in particular by means of the mobile communication device or the communication terminal or the operating device of the motor vehicle, to the control device of the motor vehicle.

Additionally, as part of the method it can be provided that alternative user authentication is blocked, for example by means of a car key and/or a keyless go function implemented in a car key and/or a key function implemented in a mobile telephone in as part of the execution of the method for locking and unlocking the motor vehicle by activating the method for locking and unlocking the motor vehicle. As a result, as long as the method according to the invention is executed, a locking or unlocking of the motor vehicle is only possible by user authentication by means of an access key, i.e., by actuating the operating device in the predetermined sequence. In particular, the activation of the method for locking and unlocking the motor vehicle can also block starting the engine of the motor vehicle and/or further motor vehicle functions. By deactivating the method for locking and unlocking the motor vehicle, the blocked motor vehicle functions are enabled again, i.e., a user authentication by means of a car key and/or keyless go function and starting the engine. Therefore, all essential motor vehicle functions of the motor vehicle can be either blocked or enabled as part of the method according to the invention, so that under no circumstances can the motor vehicle be moved or its engine started, for example. It is at least conceivable that, for example, by means of the communication system, in particular by means of the mobile communication device or the communication terminal, it can be specified by the user of the motor vehicle which motor vehicle functions of the motor vehicle are blocked or enabled as part of the method according to the invention.

It is expedient if the authorization key is actively requested from a user of the motor vehicle by means of the communication system. As a result, the user is actively asked to provide an authorization key when the method according to the invention is executed. It is conceivable that the communication system provides and outputs a visual, auditory, or audiovisual request for this purpose.

Expediently, it is provided that the authorization key is provided immediately when the user activates the execution of the method for locking and unlocking a motor vehicle by the user actuating the operating device in a sequence, wherein this sequence of actuations is detected and stored as an authorization key in the control device. The authorization key represents a personal, password stored within the vehicle, which is determined from the predetermined sequence of actuations of the operating device. The authorization key can be freely designed with regard to its length and complexity by the user varying the sequence of actuations of the operating device. This has the advantage that by means of the authorization key, the motor vehicle can be relatively well protected against unauthorized unlocking.

The authorization key can have any number of key points (length of the authorization key), wherein each key point can be occupied with a freely chosen character, preferably a number (complexity of the authorization key). If the operating device is realized by a door handle, this can be actuated to provide an authorization key, for example by pulling and releasing it. By means of the door handle, an exemplary 4-point authorization key is provided by actuating it as follows:

pull-pull and release for at least 5 seconds,
pull-pull-pull-pull-pull and release for at least 5 seconds,
pull-pull-pull and release for at least 5 seconds,
pull and release for at least 5 seconds.

Here, the control device of the motor vehicle determines the number of "pulls of the door handle" and "releases of the door handle", i.e., the number of actuations of the door handle, wherein a "release of the door handle" pause lasting longer than 5 seconds signals that the already determined actuations "pulls of the door handle" should be summed up and stored as a current key point and the next key point should be input. It goes without saying that other time periods can also be defined for the specified "release of the door handle" pause, in particular those that are longer or shorter than 5 seconds, preferably 1 second, 2 seconds, 3 seconds, or 4 seconds.

Security against unauthorized unlocking of the motor vehicle can therefore be further increased in that each time the method for locking and unlocking the motor vehicle is executed again, a new authorization key has to be provided. Expediently, it can be provided that this new authorization key differs from a previously used authorization key.

Furthermore, it can be provided that, as part of providing the authorization key to the control device, a key confirmation is performed, wherein the key confirmation is optionally performed by a user of the motor vehicle being asked to re-enter the authorization key immediately after the authorization key has been provided in the control device in order to confirm the stored authorization key, wherein the stored authorization key is approved and is used in the method to lock and unlock the motor vehicle if the stored authorization key and the re-entered authorization key match. Therefore, the authorization key initially provided by the user is checked, which has the advantage of preventing accidental actuation of the operating device and incorrect actuation. If, in the course of the key confirmation, an accidental and/or incorrect actuation of the operating device takes place, i.e., the stored authorization key and the re-entered authorization key do not match, either it is possible to completely repeat the provision of the authorization key or alternatively the method according to the invention can be deactivated. In both cases, a notification can be output to the user by means of the communication system in order to inform them about the unsuccessful key confirmation.

It is also expedient if the operating device is realized by a door handle of the motor vehicle or another control means of the motor vehicle that is actuated from outside of the motor vehicle. The operating device can be actuated back and forth, for example, between a first position and a second position spaced apart therefrom. However, further positions can also be provided. As long as the operating device is realized by a door handle, it can be provided that the first position is realized by a normal position in which the door handle rests against a motor vehicle door of the motor vehicle, and that the second position is realized by an actuation position in which the door handle is lifted from the motor vehicle door. Expediently, the normal position of the door handle can represent the above-described "release" and the actuation position of the door handle can represent the "pull".

It is expediently provided that the method for locking and unlocking a motor vehicle is provided as part of a software update of the motor vehicle on the same. The method according to the invention can therefore be relatively simply retrofitted in existing motor vehicles. Expediently, such a software update can be performed using a wired connection in a service garage, for example. However, a wireless and unconnected software update is also possible, for example as part of a fleet software update (so-called fleet update).

According to a further fundamental idea of the invention, a motor vehicle is proposed that is equipped with an operating device which, can be actuated from outside of the motor vehicle, and/or with a communication system, wherein the operating device and/or the communication system each communicate with a control device of the motor vehicle, wherein the control device is set up to execute the method for locking and unlocking a motor vehicle according to the preceding description. Thus, an advantageous motor vehicle is provided, by means of which the method according to the invention can be executed.

A further fundamental idea of the invention relates to a communication system, in particular a mobile communication device or a communication terminal of a motor vehicle, which comprises an executable program tailored to the method for locking and unlocking a motor vehicle according to the preceding description and having commands which, when the program is executed by the communication system, cause the latter to communicate with a control device of a motor vehicle, in order to in turn cause the said control device to execute the method for locking and unlocking a motor vehicle according to the preceding description. Thus, an advantageous communication system is provided, by means of which the method according to the invention can be executed.

In summary, the invention expediently relates to a method for locking and unlocking a motor vehicle, having an operating device, which is mounted on the motor vehicle and can be actuated, and a communication system, wherein the operating device and the communication system communicate with a control device of the motor vehicle, the method having the steps: providing an authorization key to the control device, locking the motor vehicle by means of the control device, unlocking the motor vehicle by means of the control device if a successful user-authentication of a user of the motor vehicle has been performed. It is essential that the user of the motor vehicle activates and deactivates the execution of the method for locking and unlocking the motor vehicle by means of the communication system. The invention further expediently relates to a motor vehicle, which is set up to execute the said method, and to a communication system.

Further important features and advantages of the invention result from the dependent claims, the drawings, and the associated FIGURE description according to the drawings.

It is understood that the aforementioned features and the features still to be explained in the following can not only be used in the respectively specified combination, but also in other combinations or in isolation without leaving the scope of the present invention.

Preferred exemplary embodiments of the invention are represented in the drawings and are explained in more detail in the following description, wherein the same reference signs refer to identical or similar or functionally identical components.

BRIEF DESCRIPTION OF THE SOLE DRAWING

Here:
The sole drawing schematically shows a motor vehicle and communication systems for executing the method for locking and unlocking a motor vehicle.

DETAILED DESCRIPTION

The sole drawing shows a motor vehicle referred to as a whole with the reference numeral 1, which is equipped on a motor vehicle door with an operating device 2, which can be actuated from outside the motor vehicle 1 and is realized using a door handle as an example. The operating device 2 can be adjusted back and forth by a user of the motor vehicle 1 (not shown) manually actuating the device between a normal position, in which the door handle rests against the motor vehicle door, and an actuating position, in which the door handle is lifted from the motor vehicle door.

The motor vehicle 1 also has a control device 4, which is only specified by a dashed box. In FIG. 1, two communication systems 3 are also illustrated, specifically a communication terminal 6 mounted permanently in the interior of the motor vehicle 1, which in practice is also referred to as a head unit, and a mobile communication device 5, which is designed to be separate from the motor vehicle 1 and which, for example, can be realized by a mobile telephone. The operating device 2 and the communication system 3 can communicate with the control device 4 wirelessly or with a wired connection. In the sole drawing, the control device 4, the operating device 2, and the communication terminal 6 are connected to communicate with each other via a communication cable, while the mobile communication device 5 is connected in a communicative manner wirelessly at least with the control device 4 via a radio link illustrated with waves in the sole drawing.

The method for locking and unlocking the motor vehicle 1 is implemented in an exemplary manner in the control device 4 and can be executed by the same, wherein a user of the motor vehicle 1 initially activates the execution of the method for locking and unlocking the motor vehicle 1 by means of the communication terminal 6 or the mobile communication device 5. The mobile communication device 5 can have an executable program (app) for example for this purpose.

In a first step, the user of the motor vehicle 1 is asked to provide an authorization key by a visual, auditory, or audiovisual notification from the communication terminal 6 or the mobile communication device 5. This is realized in the present case in that the authorization key is provided immediately when the user activates the execution of the method for locking and unlocking a motor vehicle 1 by the user actuating the operating device 2 in an arbitrary sequence, wherein this sequence of actuations is detected and stored as an authorization key in the control device 4, for example by means of sensors arranged on the motor vehicle door and/or the door handle. The control device 4 is therefore expediently set up to determine a digital authorization key, for example, by using sensor signals provided by the sensors. The authorization key thus represents a personal password stored within the vehicle, which is determined from the predetermined sequence of actuations of the operating device 2. Subsequently, in a further step, the locking of the motor vehicle 1 is carried out by means of the control device 4, whereby the motor vehicle 1 is secured against unauthorized access.

To unlock the motor vehicle 1 by means of the control device 4 it is provided that a user authentication of the user of the motor vehicle 1 is performed. To this end, the user must provide an access key to the motor vehicle 1 or the control device 4. In the present case, this is realized by the user of the motor vehicle 1 actuating the operating device 2 in the sequence of actuations known to them. The control device 4 can detect the sequence of actuations of the operating device 2, for example again by means of the sensors arranged on the motor vehicle door and/or the door handle, and stores these as an access key in the control device 4. The control device 4 then performs a comparison, in which the access key is compared with the authorization key. In this case, the locked state of the motor vehicle 1 is maintained if the access key does not match the authorization key. The motor vehicle 1 is unlocked if the access key matches the authorization key.

The method for locking and unlocking a motor vehicle 1 thus provides the user of the motor vehicle 1 a new type of user authentication over the classic user authentication methods known to date (car key, car key with implemented keyless go function), in which a physical key is not used, but rather only an immaterial password. This has the advantage that the user of the motor vehicle 1 can store their car key etc. inside the motor vehicle 1 and lock and unlock the motor vehicle 1 using the method for locking and unlocking a motor vehicle 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for locking and unlocking a motor vehicle having an operating device mounted on the motor vehicle and actuatable from outside the motor vehicle, and a communication system, wherein the operating device and the communication system communicate with a control device of the motor vehicle, the method comprising:

receiving, by the control device, an authorization key;

locking, by the control device, the motor vehicle;

authenticating a user of the motor vehicle by detecting and storing a sequence of actuations of the operating device as an access key;

unlocking, by the control device, the motor vehicle responsive to the access key matching the authorization key; and maintaining, by the control device, the motor vehicle in a locked state responsive to the access key not matching the authorization key, wherein the user of the motor vehicle activates and deactivates the execution of the method for locking and unlocking the motor vehicle using the communication system, and wherein the activation or deactivation of the execution of the method for locking and unlocking the motor vehicle is access-protected by a keyword.

2. The method of claim 1, wherein the communication system is a mobile communication device that is separate from the motor vehicle.

3. The method of claim 1, wherein the communication system is a communication terminal mounted on the motor vehicle.

4. The method of claim 1, wherein activating the method for locking and unlocking the motor vehicle blocks user authentication by a car key, a keyless go function implemented in the car key, or a key function implemented in a mobile telephone.

5. The method of claim 1, wherein the authorization key is actively requested from the user of the motor vehicle by the communication system.

6. The method of claim 1, wherein the authorization key is provided immediately when the user activates the execution of the method for locking and unlocking a motor vehicle by the user actuating the operating device in a sequence, wherein the sequence of actuations is detected and stored as an authorization key in the control device.

7. The method of claim 1, wherein a key confirmation is performed as part of receiving the authorization key by the control device, wherein the key confirmation is performed by the user of the motor vehicle being asked to re-enter the authorization key immediately after the authorization key has been provided in the control device in order to confirm the stored authorization key, wherein the stored authorization key is approved and is used in the method to lock and unlock the motor vehicle if the stored authorization key and the re-entered authorization key match.

8. The method of claim 1, wherein the operating device is a door handle of the motor vehicle or another control means of the motor vehicle that is actuated from outside of the motor vehicle.

9. The method of claim 1, wherein the method is provided as part of a software update of the motor vehicle.

10. A motor vehicle comprising:

a control device;

an operating device actuatable from outside of the motor vehicle; and a communication system, wherein the operating device and the communication system each communicate with the control device of the motor vehicle, wherein the control device is configured to receive an authorization key;

lock the motor vehicle;

authenticate a user of the motor vehicle by detecting and storing a sequence of actuations of the operating device as an access key;

unlock the motor vehicle responsive to the access key matching the authorization key; and maintain the motor vehicle in a locked state responsive to the access key not matching the authorization key, wherein the user of the motor vehicle activates and deactivates the execution of the method for locking and unlocking the motor vehicle using the communication system, and wherein the activation or deactivation of the execution of the method for locking and unlocking the motor vehicle is access-protected by a keyword.

11. The motor vehicle of claim 10, wherein the communication system is a mobile communication device that is separate from the motor vehicle.

12. A method comprising:
a) receiving, by a communication system, a keyword, wherein responsive to the receiving of the keyword, initiating a method of locking and unlocking a motor vehicle by
b) receiving, by the motor vehicle, an authorization key;
c) locking, by the motor vehicle, the motor vehicle subsequent to receipt of the authorization key;
d) authenticating a user of the motor vehicle by detecting and storing a sequence of actuations of an operating device as an access key, wherein the operating device is mounted on the motor vehicle; and
e) unlocking, by the control device, the motor vehicle responsive to the access key matching the authorization key.

13. The method of claim 12, wherein the communication system is a mobile communication device that is separate from the motor vehicle.

14. The method of claim 12, wherein the authorization key is actively requested from the user of the motor vehicle by the communication system.

* * * * *